(12) United States Patent
Contos et al.

(10) Patent No.: US 6,236,180 B1
(45) Date of Patent: May 22, 2001

(54) SMART WINDSHIELD WIPER WASH SYSTEM

(75) Inventors: Joseph G. Contos, Plymouth; Mohamed S. Meskouri, Ann Arbor; Jerald P. Roach, Brighton, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/418,057

(22) Filed: Oct. 14, 1999

(51) Int. Cl.[7] ................. B60S 1/08; B60S 1/46
(52) U.S. Cl. ............. 318/444; 318/85; 318/480; 318/482; 318/483; 318/DIG. 2; 15/250.02
(58) Field of Search ................. 318/41, 51, 85, 318/283, 443, 444, 480, 482, 483, DIG. 2; 15/250.01, 250.02

(56) References Cited

U.S. PATENT DOCUMENTS

| | | | |
|---|---|---|---|
| 3,582,732 | * 6/1971 | Kovalsky | 318/102 |
| 4,037,146 | 7/1977 | Kondo . | |
| 4,131,834 | * 12/1978 | Blaszkowski | 318/483 |
| 4,388,574 | * 6/1983 | Bois et al. | 318/443 |
| 4,393,341 | 7/1983 | Byrne . | |
| 4,595,866 | 6/1986 | Fukatsu et al. . | |
| 4,885,512 | 12/1989 | Gille et al. . | |
| 5,049,794 | * 9/1991 | Okada et al. | 318/443 |
| 5,252,898 | 10/1993 | Nolting et al. . | |
| 5,276,388 | 1/1994 | Levers . | |
| 5,789,886 | 8/1998 | Ivice . | |
| 5,811,950 | 9/1998 | Lawson . | |
| 5,872,437 | 2/1999 | Pientka et al. . | |
| 5,944,910 | * 8/1999 | Fujii | 134/6 |
| 6,084,519 | * 7/2000 | Coulling et al. | 340/602 |

* cited by examiner

Primary Examiner—Bentsu Ro
(74) Attorney, Agent, or Firm—Mark P. Calcaterra

(57) ABSTRACT

A windshield washer control system for use on a vehicle is herein disclosed. The windshield washer control system for use on a vehicle having an occupant compartment with a windshield and a windshield wiper device. The wiper device is movable across a predetermined area of the windshield and the windshield washer device includes a sprayer and a sprayer nozzle. The windshield washer device is comprised of a windshield transparency detection system and a controller unit. The controller unit includes three operating modes. The first operating mode is defined by the windshield washer device being manually operable. The second operating mode is defined by the windshield washer device operating by cycle, wherein the windshield washer device is controlled to spray after a predetermined number of wiper cycles. The third operating mode is defined by the windshield washer device being automatically operable by using the windshield transparency detection system.

15 Claims, 3 Drawing Sheets

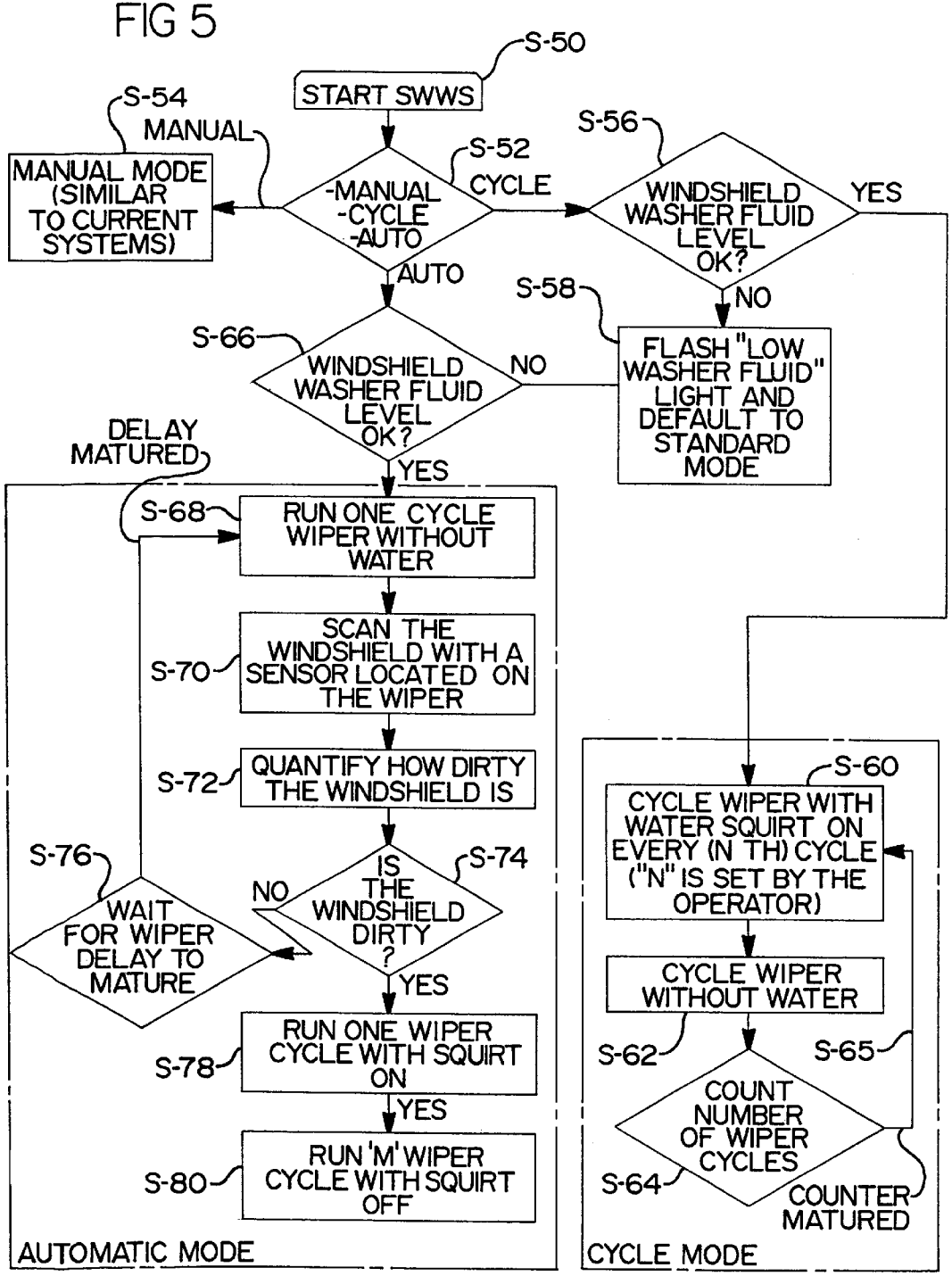

SMART WINDSHIELD WIPER WASH SYSTEM

FIELD OF THE INVENTION

The present invention relates generally to the development of a windshield washer control system and more particularly to the incorporation of a windshield washer control system using three operating modes. The first operating mode is a manual mode; the second operating mode is a cycle mode; and the third operating mode is an automatic mode. The three operating modes allow for the driver to effectively wash the windshield according to the conditions in which one is driving in.

BACKGROUND OF THE INVENTION

Currently the ability to operate a windshield washer control system is either by manual or automatic control. The operation of a windshield wiper in manual mode has the potential of becoming a distraction to the driver. In response to a dirty windshield, the operator of the vehicle activates the windshield washer system manually. In order to manually activate the system the operator must turn the system on him/herself.

In contrast to the manual mode, the automatic mode incorporates the use of a windshield transparency detection system, comprised of a sensor and a transmitter. As with any system, if the components aren't functioning properly, the operating system will not work appropriately. An example of malfunctioning potentials within an automatic operating system is if the sensor is not sensitive enough to detect the transparency of the windshield, the windshield will remain dirty forcing the driver to change operation settings of the washer system to manual mode. In contrast, if the sensor is too sensitive there is a waste of windshield washer fluid. The problems incurred in the automatic, as well as the manual, operating system are seen more as an inconvenience and a hassle for the operator of the vehicle. This inconvenience for the operator of the vehicle can be minimized by the present invention, which provides an alternative option to the previously mentioned operating modes.

The present invention incorporates the use of three different operating modes. The three operating modes which enable the driver to operate the washer control system dependant upon the environment in which he/she is driving. Contrast to the two previous systems, the new system incorporates a cycle operating mode which allows the driver to have flexibility in determining the way the windshield wiper system operates. In addition to the three operating modes of the present invention, manual, cycle, and automatic, an additional feature of the present invention is that the sensor for the detection of the windshield transparency in the automatic operating mode is disposed on the windshield wiper. This position of the sensor is different compared to previous washer systems which have a sensor placed on the hood of the car. The placement of the sensor on the windshield wiper allows for a more accurate determination of the transparency of the windshield relative to if the wiper system should be activated or not.

SUMMARY OF THE INVENTION

It is an object of the present invention to provide an improved windshield washer control system by utilizing three different operating modes, manual, cycle and automatic. The windshield washer control system, for use on a vehicle having a windshield wiper device, includes a washer device which further includes a windshield transparency detection system and a controller unit that controls all three operating modes.

The first operating mode of the controller unit is defined by the windshield washer device being manually operable. The second operating mode of the controller unit is defined by the windshield washer device being operated by a cycle mode wherein the system is controlled to spray after a predetermined number of wiper cycles. The third operating mode in the controller unit is the automatic mode which uses the windshield transparency detection system to operate automatically.

In particular, the present invention further includes a windshield washer control system on a vehicle utilizing a controller unit incorporating a cycle operating mode. Based upon the operation of the cycle mode, the windshield washer device is controlled to spray after a predetermined number of wiper cycles. The cycle operating mode is activated by a switch device which allows for the operator to select a predetermined number of wiper cycles between the wash cycles.

If the automatic mode of the windshield washer control system is chosen, it is comprised of a transparency detection system which includes an infrared transmitter and a sensor. The sensor is disposed on the wiper device. In addition, a controller unit utilizes the windshield transparency detection system for automatically operating the washer system. Initially, the windshield transparency system detects that the windshield has a transparency level above or below a predetermined level. The automatic operating mode of the windshield washer control system also includes a switch device which allows for the operator to select the automatic operating mode.

Further areas of applicability of the present invention will become apparent from the detailed description provided hereinafter. It should be understood however that the detailed description and specific examples while indicating preferred embodiments of the invention are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings wherein;

FIG. 5 is a functionality flow chart of the smart windshield wiper control system indicating operation of all three operating systems.

DETAILED DESCRIPTION OF THE PREFERRED EMBODIMENTS

Figure 1:
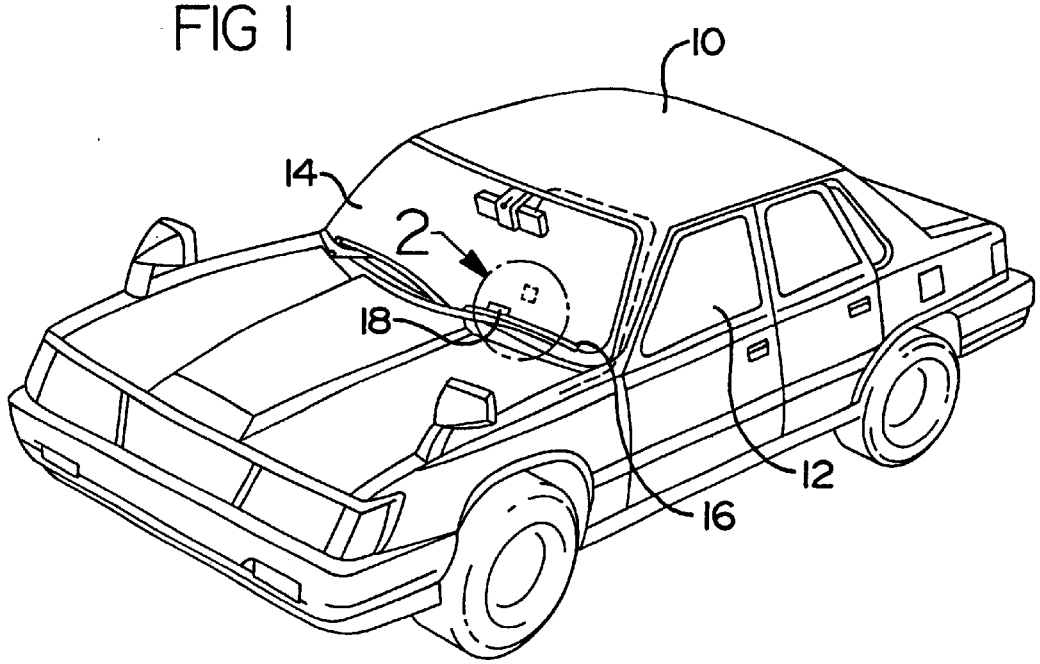
FIG. 1 is a perspective view of a vehicle equipped with a windshield washer control system according to the present invention.

Referring first to FIG. 1 which is a perspective view of a vehicle 10 with an occupant compartment 12 and a windshield 14. Located on the windshield 14 is a windshield wiper device 16 and disposed on the wiper device 16 is a sensor 18.

Figure 2:
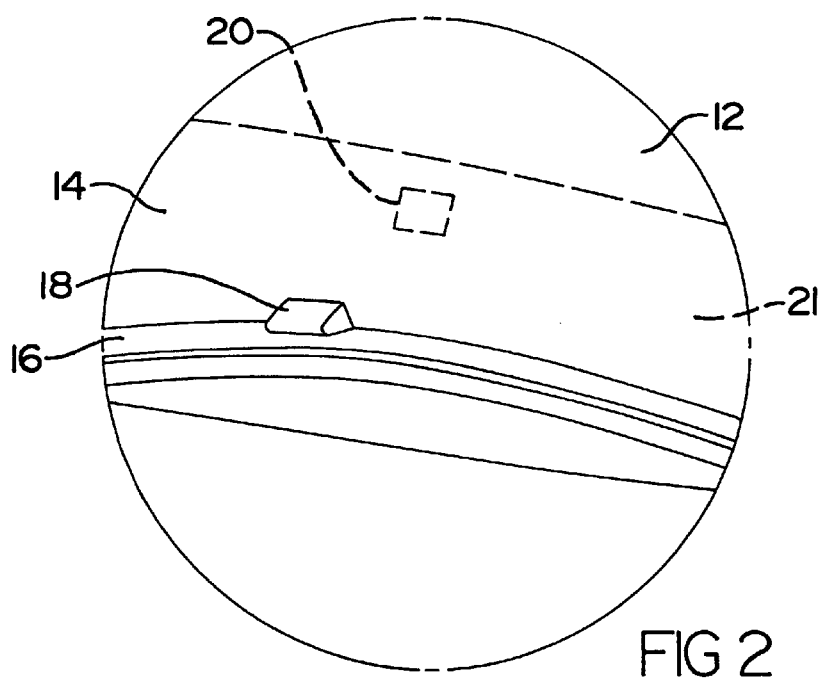
FIG. 2 is an enlarged view of the windshield which includes the windshield wiper sensor and IR transmitter of the windshield transparency system.

With particular reference to FIG. 2, which is an enlarged sectional view of FIG. 1, the IR transmitter 20 is located in the occupant compartment 12 as well as a sensor 18 disposed on the wiper device 16. The sensor 18 and the IR transmitter 20 are part of the transparency detection system which is used in the automatic operating mode of the washer control system. Preferably, the IR transmitter 20 is disposed on the dashboard 21, but is not limited to this location.

Figure 3:
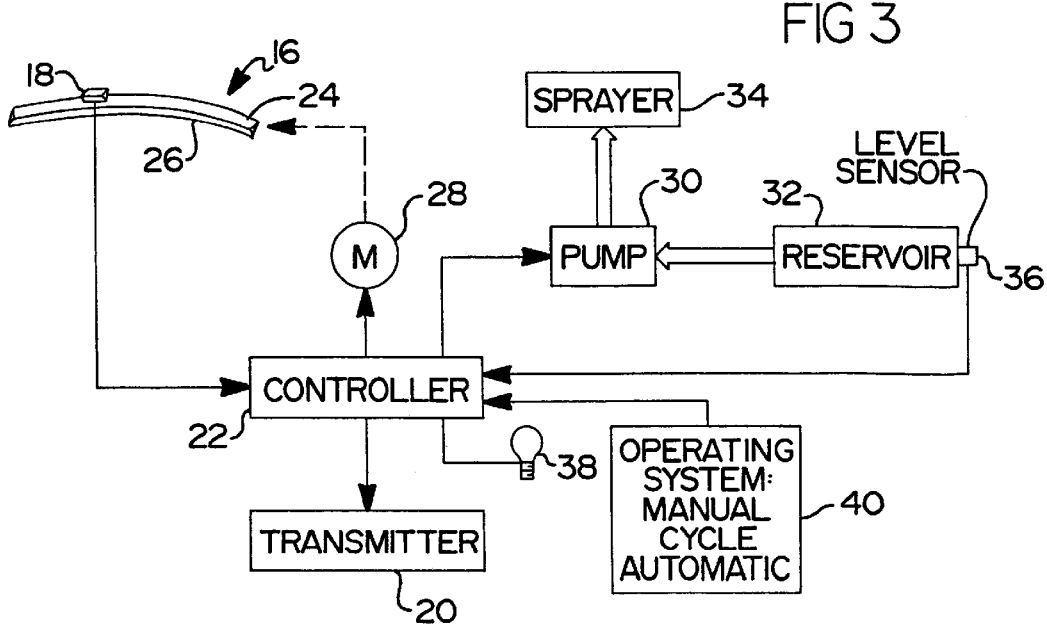
FIG. 3 is a schematic diagram of the washer control system including all three operating systems and their components.

The fundamental basis for the washer control system lies in the controller 22 as shown in FIG. 3. The controller 22 processes the feedback from the washer control system components and determines the proper response from the washer control system.

As seen in FIG. 3, the wiper device 16 includes a wiper blade 26 supported by a wiper arm 24. The wiper arm 24 is driven by a motor 28 which is controlled by controller 22. The washer system includes a pump 30 which draws washer fluid from reservoir 32 and delivers the fluid to sprayer 34. Located on the fluid reservoir 32 is a fluid level sensor 36, which is activated upon the washer fluid falling below a predetermined level. The fluid level sensor 36 signals the controller 22 to illuminate the "low washer fluid" light 38 located within the operator's viewing area.

In order to initiate the washer control system's operating modes, a switch device 40, as shown in FIGS. 3 and 4, is utilized. The switch device 40 allows the operator to select the operating mode of the washer control system. The switch device 40 includes a rotary switch 42 which allows for both manual and cycle operating modes. In addition to the rotary switch 42, the switch device 40 has a push button 44 allowing the operator to select the automatic operating mode. Included on the switch device 40, is an intermittent wiper delay dial 46 that controls the variable delay of the wiper device between movements across the windshield.

Upon activation of the manual operating system, via rotation in a first direction of rotary switch 42 of switch device 40, a signal is sent to the controller 22 which then activates motor 28, leading to the movement of the wiper device 16. In addition to the controller 22 sending a signal to the motor 28, a signal is sent to the pump 30. The pump 30 draws washer fluid from the reservoir 32 and into the sprayer 34 which emits the washer fluid onto the windshield 14. When it is determined to be necessary by the operator of the vehicle 10, the rotary switch 42 of switch device 40 can be moved into the first direction thereby activating the manual operating mode.

With particular reference to FIG. 5, a flow chart includes the step function of the first through third operating modes. The start of the smart windshield washer system (SWWS) at step S-50 is activated by the operator of the vehicle determining the operative mode. The initiation of the manual operation mode S-52 by means described above, results in the activation of the manual mode S-54 and all components necessary for operation, as described previously.

Figure 4A:
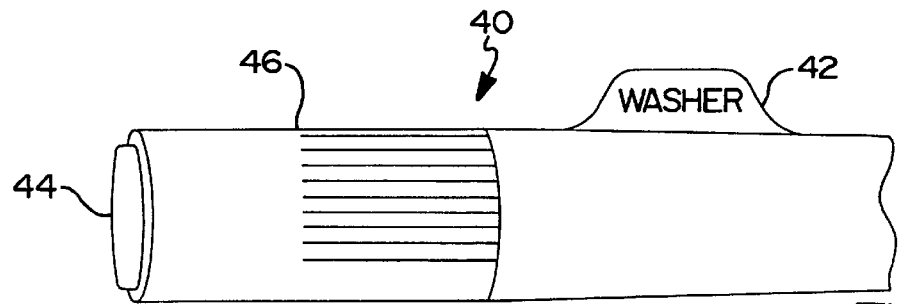
FIG. 4(a) is a frontal diagram of the switch device which controls the three operating modes.
Figure 4B:
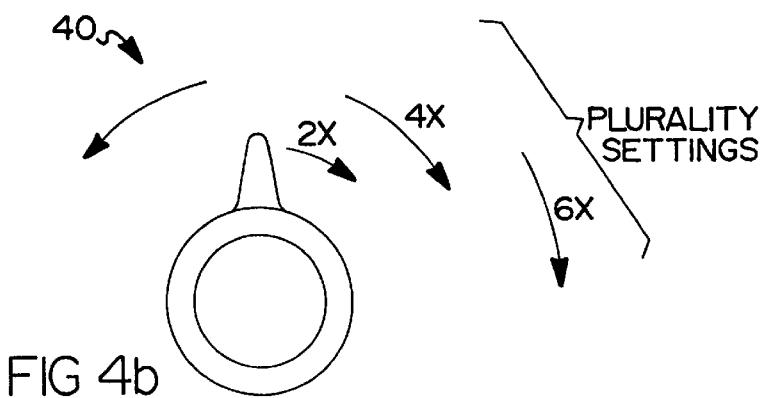
FIG. 4(b) is an end view of the switch device indicating the rotary switch and plurality of settings, as well as a push button for the automatic washer.

The features and functionality of the switch device 40 for the cycle operating system can be seen in FIGS. 4(a) and (b). The rotary switch 42 can be moved in a second direction that has a plurality of settings for the cycle operating mode. Using the rotary switch 42, the operator is able to choose the setting for the number of predetermined wiper cycles used in the cycle operating mode. In addition to the manual operating mode, the cycle operating mode becomes activated following a predetermined number of wiper cycles set by the operator. The cycle operating mode of the washer control system relies upon the controller unit 22 wherein the windshield washer device 16 is activated after a predetermined number of wiper cycles, indicated by "2×", "4×", and "6×", in FIG. 4b. These settings are chosen by the operator, allowing for variation in the cycle operating mode.

In addition to a plurality of wiper settings, an intermittent wiper delay 46 is available to the operator. The intermittent wiper delay 46, provides flexibility in setting time intervals between wiper cycles. In reference to FIG. 3, upon initiation of the cycle operating mode, the controller 22 simultaneously activates the motor 28 and pump 30 after completion of the predetermined number of wiper cycles. The pump 30 draws fluid from the washer fluid reservoir 32 which is transferred to the sprayer 34 and emitted onto the windshield 14. In addition, the windshield wiper device 16 is activated by the motor 28 and results in movement of the wiper arm 26. Located on the washer fluid reservoir 32 is a level sensor 36 which detects the level of the windshield washer fluid. The purpose of the level sensor 36 is to detect a predetermined level of windshield washer fluid in the reservoir 32 and activate if the washer fluid level is not sufficient. Once the level sensor 36 is activated a response is sent to the controller 22 which then signals the "low washer fluid" light 38 to become illuminated. Upon illumination of the "low washer fluid" light 38, the operating system reverts to a manual operating system either automatically by the controller 22 or can alternatively be done by the vehicle operator so that the vehicle operator can choose when to use the washer system to conserve fluid.

With particular reference to FIG. 5, the sequential steps involved in the cycle operating mode can be seen in a flow chart. Activation of the smart windshield washer system S-50 has the potential of resulting in the operator selecting the cycle operating mode at step S-52 by the switch means described above. Upon initiation of the cycle operating mode S-52, the level sensor 36 detects the washer fluid level at step S-56. Based upon the fluid level either a low washer fluid light will illuminate and the washer system will sequentially default to standard mode S-58. On the other hand, if sufficient washer fluid is present the cycle mode will become activated, with washer fluid being emitted at every $n^{th}$ cycle at step S-60. In between every $n^{th}$ cycle, a wiper cycle will continue without washer fluid S-62, followed by a counter which counts the number of wiper cycles 864 and matures with every sequential wiper cycle. This process proceeds until the operator makes a switch in the operating modes S-52, or the washer fluid level decreases and a default to standard mode occurs at step 858.

The third operating mode which is the automatic operating mode utilizes all of the components of the washer control system, shown in FIG. 3. The switch device 40 seen in FIGS. 4(a) and (b) allows the operator to set the washer control system to an automatic operating mode. This can be done by pushing a push button 44 as seen on the switch device 40 in FIG. 4. Upon activation of the automatic operating mode, the controller 22 receives a signal from the sensor 18 which is disposed upon the wiper device 16. The sensor 18 as well as the IR transmitter 20, disposed on the dashboard 21 in the occupant compartment 12, comprise the transparency detection system of the automatic operating mode.

Once a predetermined level of transparency is reached, due to the collection of dirt upon the windshield 14, the sensor 18 is activated, sending a response to the controller 22. The controller 22 then sends a signal to the pump 30 which draws the washer fluid from the washer fluid reservoir 32 into the sprayer 34. The sprayer 34 then sprays the fluid onto the windshield 14. As with the cycle operating mode, there is utilization of the level sensor 36 located on the washer fluid reservoir in the automatic operating mode. The level sensor 36 detects a predetermined level of the windshield washer fluid. If the level sensor 36 is activated due to an inadequate level of washer fluid, a response is sent back to the controller 22 which then activates a default setting back into the manual operating mode. Following the activation of the pump 30 by controller 22, the controller 22 also signals the motor 28, causing the movement of the wiper device 16 on the windshield 14.

The flow chart, in FIG. 5, indicates that upon activation of the automatic operating system S-52, the controller 22 receives a signal from the washer fluid level sensor 36 which determines if adequate fluid level is present at step S-66. If the windshield washer fluid level is not adequate, a "low washer fluid" light 38 is activated and the washer system defaults to a manual operating mode S-58. If there is no such response from the level sensor the automatic operating mode will complete one wiper cycle without the use of washer fluid S-68. The predetermined area of the windshield 14 will be scanned by the sensor 18 which is located on the wiper device 16 at step S-70. The sensor 18 disposed on the wiper device 16 in addition to the IR transmitter 20 disposed the dashboard 21 of the occupant compartment 12 will detect the level of transparency for the windshield 14 or quantify how dirty the windshield is, at step S-72. If the windshield transparency is below an optimum level S-74, the automatic operating mode will run one wiper cycle with the release of windshield washer fluid S-78. Following the release of the windshield washer fluid, the wiper cycle will complete a predetermined number of wipes to clear the windshield of fluid at step S-80. If the windshield transparency is above a predetermined level S-74, the automatic operating mode will wait for the wiper delay to mature S-76. Upon the maturing of this delay, the wiper device 16 will cycle without fluid S-68, followed by scanning the windshield 14 for transparency S-70. The automatic operating mode will continue until the operator sets the operating system either to cycle or manual operating mode by using the switch device 40 or a windshield washer fluid level falls below a predetermined level S-66, causing the level sensor 36 to automatically transfer to a default standard mode at step S-58.

According to the present invention, the three specified operating modes can be used based on the determination of the operator. The above-mentioned invention being thus described, it will be apparent that the same may be varied in many ways. Such variations are not to be regarded as a departure from the spirit and scope of the invention and all such modifications as would be apparent to one skilled in the art are intended to be included within the scope of the following claims.

What is claimed is:

1. A windshield washer control system for use on a vehicle having an occupant compartment with a windshield and a windshield wiper device having a wiper device movable across a predetermined area of the windshield and a windshield washer device having a pump and sprayer nozzle, comprising:

a windshield transparency detection system; and a controller unit including a first operating mode wherein the windshield washer device is manually operable, a second operating mode wherein the windshield washer device is operated by cycle, wherein the windshield washer device is controlled to spray after a predetermined number of wiper cycles and a third operating mode wherein the windshield washer device, utilizing said windshield transparency detection system, is automatically operable.

2. The windshield washer control system of claim 1, wherein said windshield transparency detection system includes an infrared transmitter and a sensor.

3. The windshield washer control system of claim 2, wherein said sensor is disposed on the wiper device.

4. The windshield washer control system of claim 2, wherein said infrared transmitter is disposed in the occupant compartment.

5. The windshield washer control system of claim 1, further comprising a switch device for selecting said first, second, and third operating modes.

6. The windshield washer control system of claim 5, wherein said switch device includes a push button and a rotary switch, whereby pushing said button activates said automatic operating mode, rotation of said rotary switch in a first direction activates said manual operating mode, and rotation of said rotary switch in a second direction activates said cycle mode.

7. A windshield washer control system for use on a vehicle having an occupant compartment with a windshield and a windshield wiper device having a wiper device movable across a predetermined area of the windshield and a windshield washer device having a pump and a sprayer nozzle comprising:

a controller unit including a cycle operating mode, wherein the windshield washer device is controlled to spray after a predetermined number of wiper cycles; and a switch device for selecting said cycle operating mode.

8. The windshield washer control system of claim 7, wherein said switch device for selecting said cycle operating mode includes a plurality of different predetermined numbers of wipe cycles to be selected by an operator.

9. The windshield washer control system of claim 7, wherein said cycle operating mode includes a sensor located on a fluid reservoir, whereby a fluid reservoir level is detected.

10. The windshield washer control system of claim 9, wherein said controller unit includes a default setting which returns to a manual operating mode upon detection by said sensor of a fluid reservoir level below a predetermined level.

11. A windshield washer control system for use on a vehicle having an occupant compartment with a windshield and a windshield wiper device having a wiper device movable across a predetermined area of the windshield and a windshield washer device having a pump and a sprayer nozzle, comprising:

a transparency detection system, including an infrared transmitter and a sensor, wherein said sensor is disposed on the wiper device;

a controller unit including an automatic operating mode, wherein the windshield washer device, utilizing said windshield transparency detection system, is automatically operable; and a switch device for selecting said automatic operating mode.

12. The windshield washer control system of claim 11, wherein said infrared transmitter is disposed in the occupant compartment.

13. The windshield washer control system of claim 11, wherein said switch device includes a pushbutton, whereby pushing said pushbutton activates said automatic operating mode.

14. The windshield washer control system of claim 11, wherein said automatic operating mode includes a sensor located on a fluid reservoir, whereby a fluid reservoir level is detected.

15. The windshield washer control system of claim 14, wherein said controller unit includes a default setting which returns to a manual operating mode upon detection by said sensor of a fluid reservoir level below a predetermined level.

* * * * *